United States Patent [19]

Tracey

[11] Patent Number: 5,084,615
[45] Date of Patent: Jan. 28, 1992

[54] OPTICAL FIBRE SENSORS WITH STRIP PORTIONS HAVING A SERIES OF TRANSVERSE RIDGES

[75] Inventor: Peter M. Tracey, Bury St. Edmunds, United Kingdom

[73] Assignee: Bestquint Limited, Bury St. Edmunds, United Kingdom

[21] Appl. No.: 511,421

[22] Filed: Apr. 19, 1990

[30] Foreign Application Priority Data

Apr. 19, 1989 [GB] United Kingdom ............... 8908800
Nov. 24, 1989 [GB] United Kingdom ............... 8926550

[51] Int. Cl.⁵ ............................................. H01J 40/14
[52] U.S. Cl. ............................ 250/227.16; 385/123
[58] Field of Search ................. 250/227.16, 227.15, 250/227.14; 350/96.29; 73/655, 656, 657

[56] References Cited

U.S. PATENT DOCUMENTS

| | | | |
|---|---|---|---|
| 4,253,727 | 3/1981 | Jeunhomme et al. | 350/96.29 |
| 4,307,386 | 12/1981 | Bridge | 250/227.15 |
| 4,342,907 | 8/1982 | Macedo et al. | 250/227 |
| 4,463,254 | 7/1984 | Asawa et al. | 250/227.16 |
| 4,572,950 | 2/1986 | Harmer | 250/227 |
| 4,618,764 | 10/1986 | Harmer | 250/227 |
| 4,770,492 | 9/1988 | Levin et al. | 350/96.29 |

FOREIGN PATENT DOCUMENTS

| | | |
|---|---|---|
| 0082604 | 6/1983 | European Pat. Off. . |
| 0082615 | 6/1983 | European Pat. Off. . |
| 0240100 | 10/1987 | European Pat. Off. . |
| 2628205 | 3/1988 | France . |
| 2125572 | 3/1984 | United Kingdom . |
| 2201511 | 9/1988 | United Kingdom . |
| 2204679 | 11/1988 | United Kingdom . |

Primary Examiner—David C. Nelms
Assistant Examiner—Que T. Le
Attorney, Agent, or Firm—Richard M. Goldberg

[57] ABSTRACT

An optical fibre sensor includes an elongate optical fibre and a casing for the fibre, the casing including a first elongate, flexible and substantially inextendable strip portion and a second elongate, flexible strip portion arranged so that the fibre therebetween is sandwiched between the strip portions, at least the first strip portion being provided with a series of transverse ridges for engaging the fibre, with grooves being formed between the ridges, and the other strip portion being adapted to bend the fibre into the grooves upon pressing together of the strip portions.

19 Claims, 4 Drawing Sheets

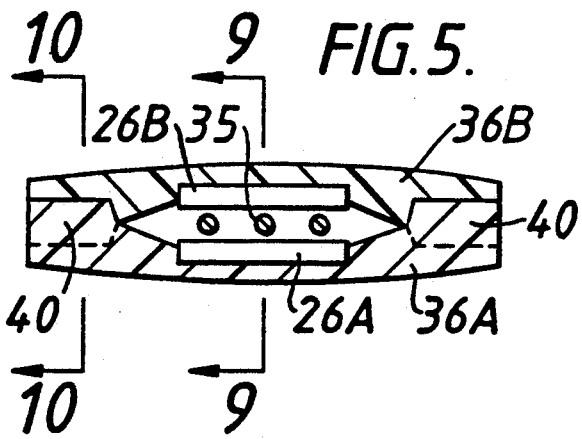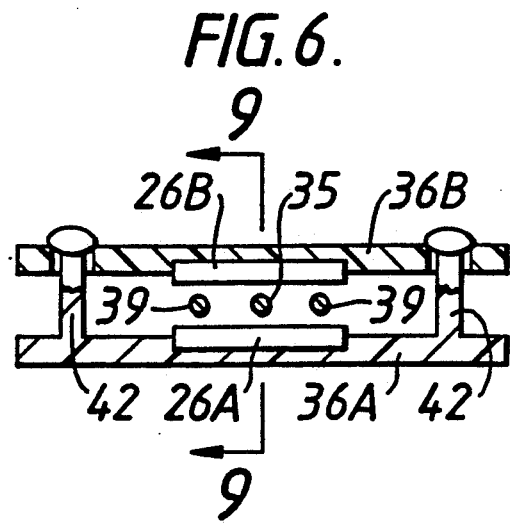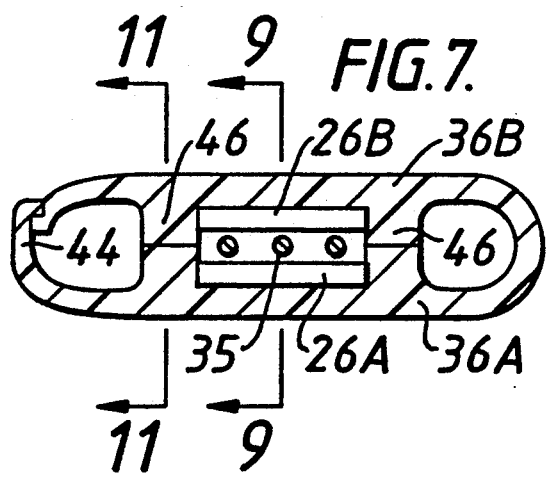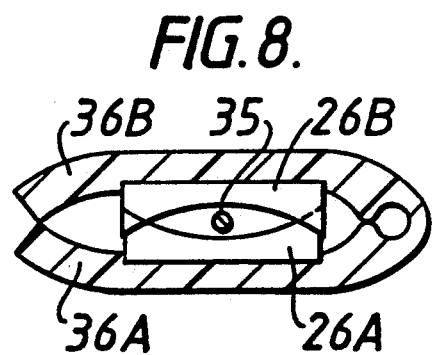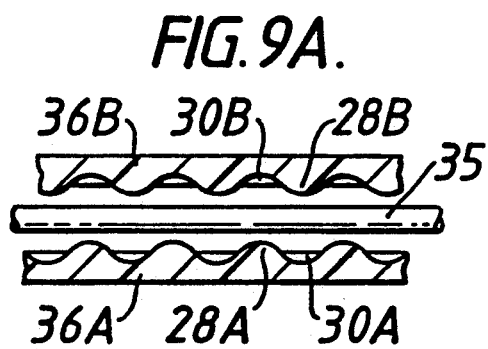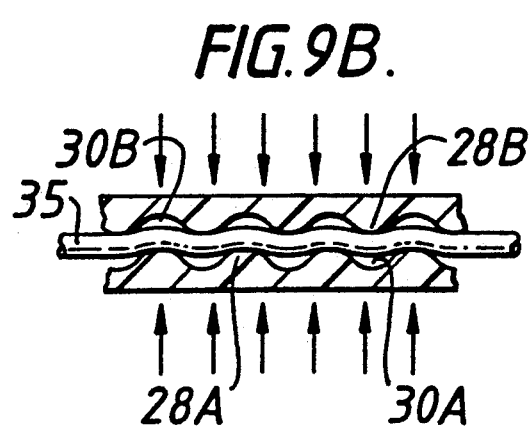

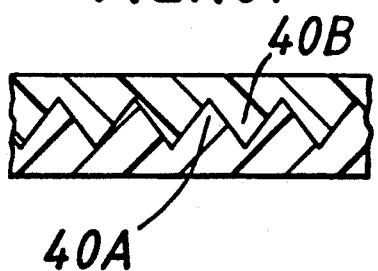
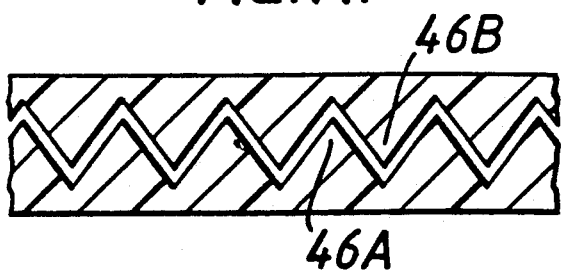
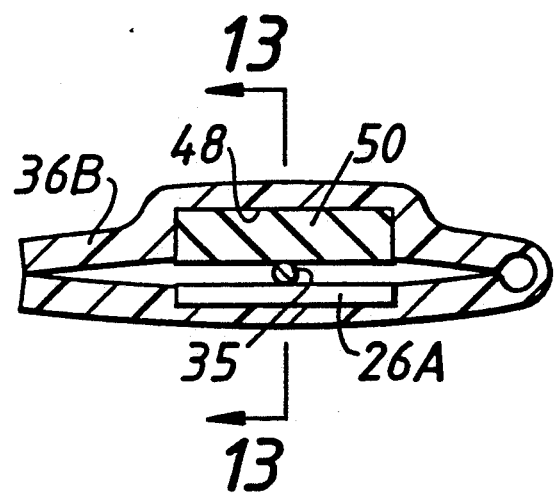
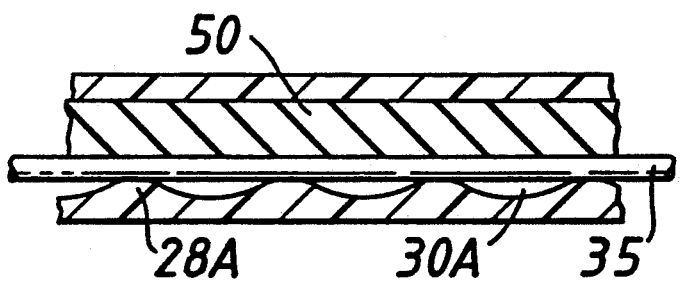
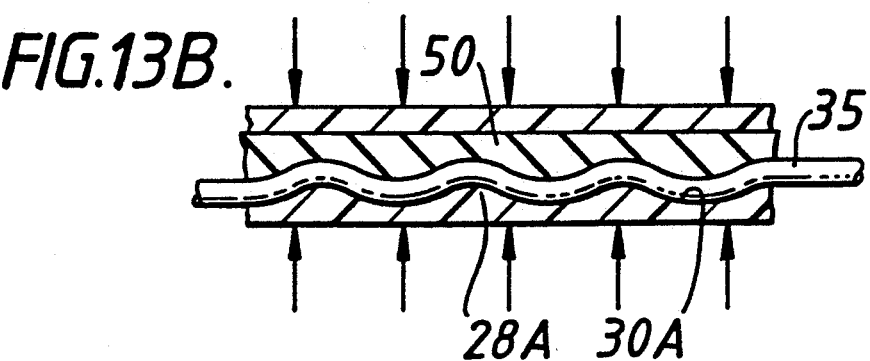

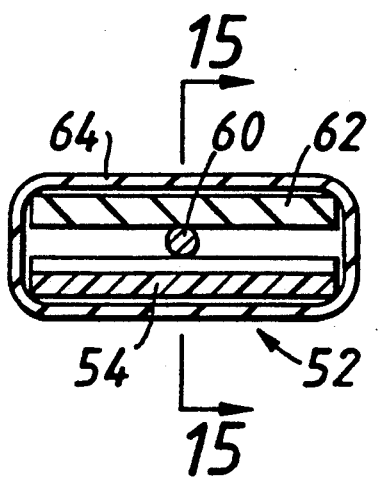
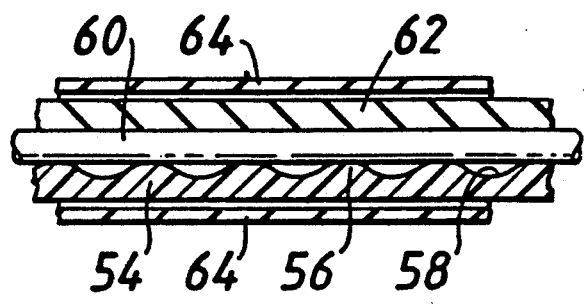
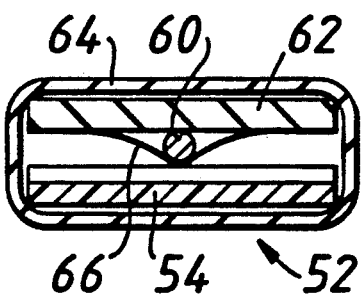
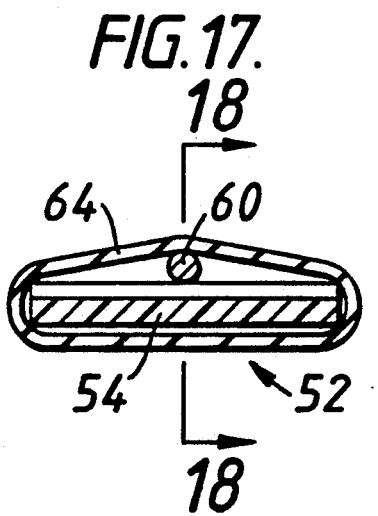
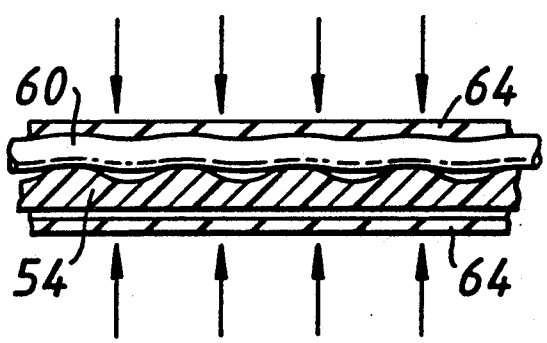
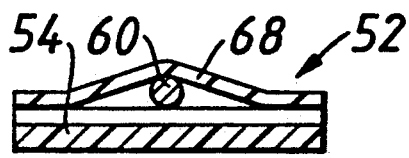

OPTICAL FIBRE SENSORS WITH STRIP PORTIONS HAVING A SERIES OF TRANSVERSE RIDGES

BACKGROUND OF THE INVENTION

1. Field of the Invention

This invention relates to sensors, primarily for sensing an applied force or pressure, which employ an optical fibre which is bent in operation of the sensor so that the light transmittance of the fibre changes and can be detected.

2. Description of the Related Art

Such a use of an optical fibre has been known for several years. In a known example described in U.S. Pat. No. 4572950 and U.S. Pat. No. 4618764, in order to achieve the required bending of the fibre, known as "microbending", in response to an applied force, a filament is wound helically around the fibre and the applied force causes the fibre to be bent into the spaces between the turns of the filament. Winding of the filament complicates manufacture of the sensor, as too does the need for an outer sheath for mechanical protection if the sensor is to be of any practical use. The application of the helical filament and sheath to only a portion of the fibre, if required, is inconvenient. JP-A-60-185626 and JP-A-59-128009 describe sensors which go some way to overcoming the problems associated with the above-mentioned sensor. In these Japanese specifications, the sensor is fitted to a rigid structure, that is to say the window frame of a car door having an electrically-operated window. The sensor has first and second rubber strips or members which sandwich the optical fibre between them. One of the strips has a series of transverse projections which engage the fibre so that when pressure is applied, the other strip bends the fibre into the spaces between the projections of the one strip and thus causes microbending. Because the strips are of a stretchable material, reliance is placed on the strips being attached to the rigid structure of the window frame in order to prevent longitudinal over-stressing of the fibre. This type of sensor is unsuitable as a general purpose sensor which can be placed in any desired position for the detection of pressure. Also, in this type of sensor, there is a risk of damage to the fibre if the fibre is assembled with the rubber strips before one of the strips is attached to the window frame, thus complicating manufacture.

SUMMARY OF THE INVENTION

In accordance with a first aspect of the present invention, the fibre is encased with at least one strip portion of a flexible but substantially inextendable material, which may for example be an extruded and pre-stretched plastics material similar to that used for packaging strapping. Thus, a sensor is produced which is strong enough in itself to resist mechanical damage without needing to be secured to a rigid structure for support, and which is thus of a general purpose nature. The strip portion or portions can easily be provided over a vast range of lengths to provide a sensing length as small as 10 mm or less, or as long as many kilometres.

In one arrangement, the fibre is sandwiched between two such strip portions, but in other arrangements, only one such inextendable strip portion is provided, with the strip portion and fibre encased in a sheath, or alternatively with the inextendable strip portion and a further strip encasing the fibre.

In accordance with a second aspect of the invention, the strip portion, or at least one of a pair of strip portions, may be provided with a series of transverse ridges and grooves, formed for example by embossing, and the two strip portions may be formed by a single strip which is folded longitudinally to encase the fibre. In this case, the edges of the strip portions opposite the fold may be secured together. This provides for easy manufacture and assembly of the sensor.

In accordance with a third aspect of the invention, each of a pair of strip portions encasing the fibre may be formed with a series of transverse ridges and grooves, and means are provided to locate the strip portions relative to each other so that the ridges of the two series are staggered, ensuring that microbending can occur in the most effective manner. The locating means may be provided by the fold between the strip portions in the case of a sensor according to the above-mentioned second aspect of the invention, or by inter-engaging formations on the strip portions such as inter-engaging projections and holes, or inter-engaging series of ridges and grooves.

It will be appreciated that a sensor may embody differents aspects of the invention mentioned above and other features as described below or as set out in the accompanying claims.

BRIEF DESCRIPTION OF THE DRAWING

Specific embodiments of the invention will now be described by way of example, with reference to the accompanying drawings in which:

FIGS. 5 to 8 are cross-sectional views of alternative forms of sensor;

FIGS. 9a and 9b are sectional views taken along the lines 9—9 shown in each of FIGS. 4 to 7, with FIG. 9a showing the sensor without an applied pressure, and with FIG. 9b showing the sensor with pressure applied;

FIG. 10 is a sectional view taken along the line 10—10 in FIG. 5;

FIG. 11 is a sectional view taken along the line 11—11 in FIG. 7;

FIG. 12 is a cross-sectional view of a further sensor according to the invention;

FIGS. 13a and 13b are sectional views taken along the line 13—13 in FIG. 12, with FIG. 13a showing the sensor without an applied pressure, and FIG. 13b showing the sensor with an applied pressure;

FIGS. 14, 16, 17 and 19 are cross-sectional views of four further sensors according to the invention; and FIGS. 15 and 18 are sectional views taken along the lines 15—15 and 18—18 in FIGS. 14 and 17, respectively.

DESCRIPTION OF THE PREFERRED EMBODIMENTS

Figure 1:
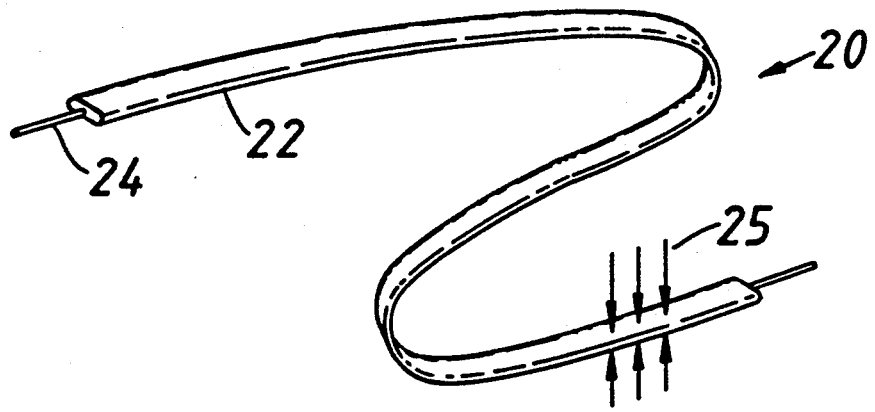
FIG. 1 is an overall view of an optical fibre sensor according to the invention.

Referring to FIG. 1 of the drawings, an optical fibre sensor 20 is overall of strip form and has an outer casing 22, through which extends an optical fibre 24. A light signal may be applied to one end of the optical fibre, and the light which is transmitted to the other end of the optical fibre may be detected. The sensor 20 is constructed so that normally there is a substantial transmission of light from one end to the other of the optical fibre, but when the casing 22 is pressed part way along its length, as shown by the arrows 25 in FIG. 1, microbending occurs in the fibre, for the reasons described below, and the amount of transmitted light is reduced. There are many applications for the sensor 20. For example, it may be used in a similar arrangement to that of the above-mentioned Japanese specifications as a "safe edge". It may be arranged around industrial machines to define a safe area, it may be distributed around a property for use in a burglar alarm system, or it may be distributed freely around open ground for military use.

Figure 2:
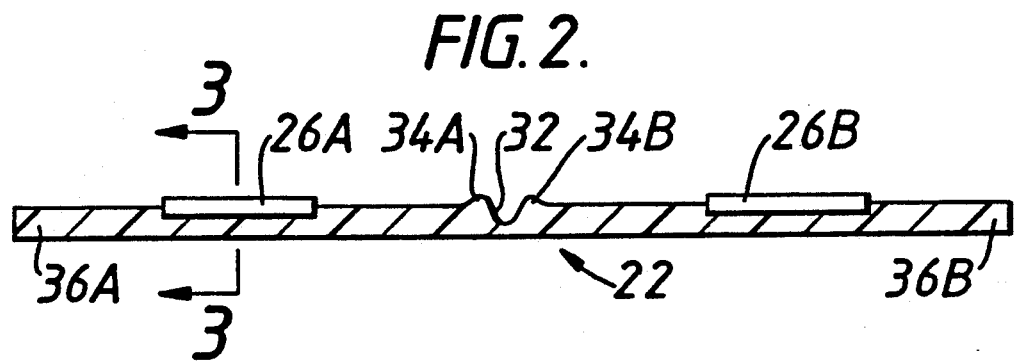
FIG. 2 is a cross-sectional view of a strip used in forming one embodiment of the sensor.
Figure 3:
FIG. 3 is a sectional view taken on the line 3—3 shown in FIG. 2.

Referring to FIGS. 2 and 3, the casing 22 is formed as an extruded strip of plastics material such as polyethylene, polypropylene, or polyester which may be stretched and reduced in cross-sectional size to give a favourable molecular structure. Similar techniques are used in the manufacture of plastic strapping for packaging uses. The extruded and stretched strip is then acted upon by a roller with various surface formations so as to produce in the strip two series 26a, 26b of transverse projections 28a, 28b and grooves 30a, 30b having a generally sinusoidal form as shown in FIG. 3. A longitudinal groove 32 is also formed along the middle of the strip, with raised ridges 34a, 34b immediately to either side of the longitudinal groove 32. This longitudinal groove 32 serves as a fold line.

Figure 4:
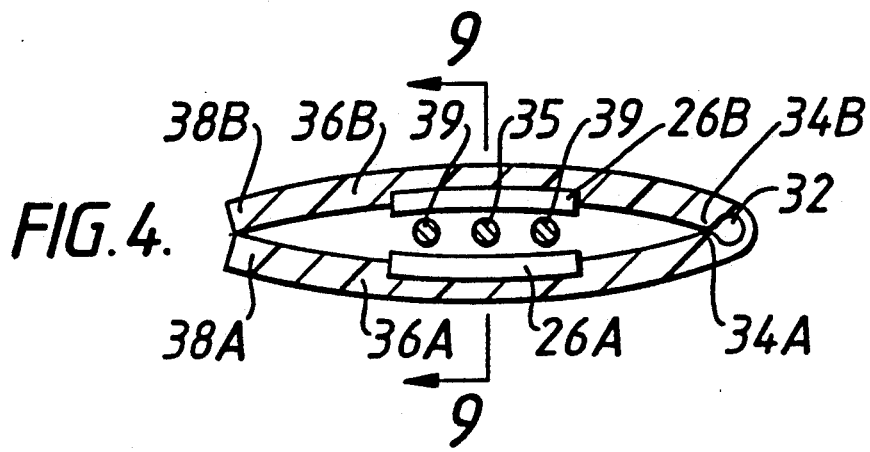
FIG. 4 is a cross-sectional view of the sensor.

Referring to FIGS. 4 and 9, the casing 22 is folded longitudinally to sandwich an optical fibre 35 between the series 26a, 26b of grooves and projections on the strip portions 36a, 36b to either side of the fold.

The free edges 38a, 38b of the strip portions are held together, for example by tape over the outside of the strip or by glue, welding or clipping. The longitudinal ridges 34a, 34b engage each other to produce bowing of the strip portions 36a, 36b to leave a natural gap for the optical fibre 35 and to ensure that the fibre is only compressed when an external force is applied.

Referring particularly to FIGS. 9a and 9b it will be noted that the transverse projections 28a on the strip portion 36a are aligned with the transverse grooves 30b of the other strip portion 36b, and that the transverse grooves 30a on the strip portion 36a are aligned with the transverse projections 28b on the strip portion 36b. That is to say, the projections of the two strip portions are staggered. As shown in FIG. 9a, when no external force is applied, the optical fibre 36 is not deformed by the casing. However, as shown in FIG. 9b, when an external force is applied, the strip portions move together, and the transverse projections 28a, 28b on the strip portions bend the optical fibre 35 into the transverse grooves 30a, 30b of the opposite strip portion, thus producing microbending of the optical fibre 35, which can be detected by detecting the amount of transmitted light through the optical fibre.

Typically, the optical fibre 35 may have an overall diameter of 0.25 mm and may be of the monomode or multimode type. Also, typically, the depth of the transverse grooves 30a, 30b may be 0.1 mm, and the pitch of the transverse grooves may be between 0.9 mm and 5 mm depending on the fibre.

Preferably, when the strip is folded to encase the optical fibre, the fibre is not held taught, but undulates slightly to allow for differential expansion and contraction between the optical fibre and the casing as a result of changing temperatures or stretching.

If desired, rather than the optical fibre starting at one end of the casing and terminating at the other end, at the other end the optical fibre may be bent back on itself and extend a second time through the casing, so that the light source and light sensor for the optical fibre can both be located at the same end of the sensor strip.

As shown in FIG. 4, two elongate filaments 39 may be disposed within the casing to either side of the optical fibre 35, preferably of the same or slightly larger diameter than that of the optical fibre 35. These additional filaments act so as to limit overtravel of the strip portions 36a, 36b and overstressing of the optical fibre 35 when an external force is applied. The additional filaments 39 are of such a flexibility so as to allow microbending of the fibre, but prevent it from being crushed.

There now follows a description of a number of modifications to the sensor described above, in which like features are designated by like reference numerals. These modified sensors may include all of the features of the sensor described above, except where otherwise stated.

Referring to FIGS. 5, 9 and 10, the casing of the sensor is formed, in this case, from two separate extruded strip portions 36a, 36b. Along the edge of each strip portion, there is a series of triangular shaped projections 40a, 40b and grooves which are inter-engaged to ensure the proper staggering of the series 26a, 26b of projections and grooves for microbending, and which are bonded in order to secure the strip portions 36a, 36b together.

Referring to FIGS. 6 and 9, the strip portions 36a, 36b are, in this case, separately formed. The strip portion 36a has, along each edge, a series of upstanding headed pins 42 which snap-engage in corresponding holes in the strip portion 36b firstly to ensure correct staggering of the series 26a, 26b of projections and grooves for microbending, and secondly to secure the strip portions 36a, 36b together. Rather than as shown in FIG. 6 where the strip portions 36a, 36b are substantially parallel, the headed pins 42 may be shorter in size to cause bowing of the strip portions 36a, 36b which will thus tend to provide an effect of centralising the optical fibre 35 and any additional filaments 39 within the casing.

Referring to FIGS. 7, 9 and 11, the strip portions 36a, 36b are, in this case, integrally formed, and the free edge of the strip portion 36a has a hooked projection 44 therealong which is a snap fit with a formation along the edge of the strip portion 36b so as to hold the strip portions 36a, 36b in the folded arrangement.

Furthermore, to either side of the series 26a, 26b of projections and grooves for microbending, there are further series of triangular projections 46a, 46b, which as shown in FIG. 11 are spaced apart when no external force is applied. When an external force is applied, the triangular projections 46a, 46b and grooves inter-engage in order to limit the degree to which the strip portions 36a, 36b can be pressed together, thus serving to protect the optical fibre 35.

The modified sensor shown in FIG. 8 is similar to the sensor of FIG. 4, with the exception that the transverse projections are higher at their ends than in the middle, having a concave shaped upper surface. Therefore, in addition to causing microbending, the projections also serve to limit the degree of pressing together of the upper and lower strip portions 36a, 36b, thus protecting the optical fibre 35.

Referring now to FIGS. 12 and 13, the series 26b of projections and grooves on the strip portion 36b is replaced by an elongate channel 48 into which is fitted an elongate resilient layer 50 of, for example, silicone rubber. As can be seen in FIG. 13a, without any external force applied, the optical fibre 35 is not deformed by the casing, but as shown in FIG. 13b, when an external force is applied, the resilient layer 50 presses the optical fibre into the grooves 30a between the projections 28a, in order to cause microbending.

Referring now to FIGS. 14 and 15, an alternative form of sensor is shown. The sensor 52 comprises a strip 54 of flexible but inextendable plastics material having a series of transverse ridges 56 and grooves 58 embossed on one side of the strip. An optical fibre 60 lies along the ridged and grooved side of the strip 54, and a further strip 62 of resilient material such as a cork rubber composite is provided so that the strips 54,62 sandwich the optical fibre 60 between them. The assembly described so far has an outer protective sheath 64 which is of a flexible and possibly soft and extendable material such as a synthetic rubber. The sheath 64 may be extruded onto the layers 54,62, or may be formed by a strip which is folded and welded. The operation of the sensor shown in FIGS. 14 and 15 is similar to that described above with reference to FIGS. 12 and 13.

FIG. 16 shows a modification to the sensor of FIGS. 14 and 15. In order to facilitate manufacture and to ensure that the optical fibre is not stretched tight when the strips 54,62 and sheath 64 are applied, the fibre is mounted on the resilient strip 62 by adhesive tape 66 before being assembled with the inextendable strip 54 and the sheath 64. Thus, it can more easily be ensured that there are slight undulations in the optical fibre 60 when it is adhered to the resilient strip 62. Alternatively, the optical fibre 60 can be mounted on the inextendable strip 54 with adhesive tape prior to assembly with the resilient strip 62 and the sheath 64.

FIGS. 17 and 18 show a further modification to the arrangement of FIGS. 14 and 15, in which the resilient strip 62 is omitted. In this case, the optical fibre 60 is sandwiched between the inextendable strip 54 and the upper portion of the sheath 64, and the sheath 64 is formed from a resilient material, such as synthetic rubber. Thus, when pressure is applied to the sensor 52, the upper portion of the sheath directly presses the optical fibre into the grooves 58 of the inextendable strip 54 to cause microbending, as shown in FIG. 18.

FIG. 19 shows a modification to the arrangement of FIGS. 17 and 18. In this case, rather than providing a sheath 64 which encircles the inextendable strip 54 and the optical fibre 60, only the upper portion of the sheath is provided in the form of a strip 68 of resilient material, and this strip 68 is welded or adhered along its edges to the strip 54 of inextendable material 2.

In the arrangements described above, the interior of the casing may be filed with a soft compressable material in order to prevent the ingress of dirt and liquids.

In the arrangements described above, the series of ridges and grooves on the inextendable strip portion(s) need not be provided along the whole length of the sensor, but only in a particular portion or portions so that the sensor has sensitive and non-sensitive zones along its length.

What is claimed is:

1. An optical fibre sensor comprising an elongate optical fibre and a casing therefor, the casing comprising a first elongate, flexible and substantially inextendable strip portion and a second elongate, flexible strip portion arranged so that the fibre therebetween is sandwiched between the strip portions, at least the first strip portion being provided with a series of transverse ridges for engaging the fibre, with grooves being formed between the ridges, and the other strip portion being adapted to bend the fibre into the grooves upon pressing together of the strip portions.

2. A sensor as claimed in claim 1, wherein the second strip portion is substantially inextendable.

3. A sensor as claimed in claim 2, wherein the first and second strip portions are formed from a single strip which is folded longitudinally to encase the fibre.

4. A sensor as claimed in claim 3, wherein a formation is provided along the strip adjacent to the fold to cause the strip portions to bow away from each other.

5. A sensor as claimed in claim 3, further comprising means to hold together the edges of the strip portions opposite the fold.

6. A sensor as claimed in claim 1, wherein said other strip portion is provided with a series of transverse ridges for engaging the fibre, with grooves being formed between the ridges, and means being provided to locate the strip portions relative to each other so that the ridges of the two series are staggered.

7. A sensor as claimed in claim 3, wherein said other strip portion is provided with a series of transverse ridges for engaging the fibre, the grooves being formed between the ridges, and means being provided to locate the strip portions relative to each other so that the ridges of the two series are staggered, and wherein the fold provides said locating means.

8. A sensor as claimed in claim 5, wherein the strip portions are separately formed and secured together.

9. A sensor as claimed in claim 8, further comprising projections formed on the first and/or second strip portion and engaging complementary holes in the other strip portion to secure the strip portions together and also serve as said locating means.

10. A sensor as claimed in claim 8, further comprising inter-engaging transverse ridges and grooves on the strip portions, which are bonded together and also serve as said locating means.

11. A sensor as claimed in claim 1, wherein the second strip portion is formed with an insert layer of resilient material for engaging the fibre, so that the fibre can be bent by the resilient material into the grooves between the ridges.

12. A sensor as claimed in claim 1, wherein the second strip portion is of a resilient material.

13. A sensor as claimed in claim 12, wherein the second strip portion is formed by part of a sheath around the first strip portion and the fibre.

14. A sensor as claimed in claim 12, wherein the second strip portion is secured along its edges to the first strip portion.

15. A sensor as claimed in claim 1, wherein at least the first strip portions are formed from extruded and longitudinally pre-stretched plastics material.

16. A sensor as claimed in claim 1, wherein the ridges and grooves are formed on at least the first strip portion by embossing.

17. A sensor as claimed in claim 1, further comprising formations on the first and second strip portion which come into engagement upon substantial pressing together of the strip portions to limit bending and stressing of the fibre.

18. A sensor as claimed in claim 1, further comprising at least one elongate flexible filament extending alongside the fibre to prevent crushing of the fibre.

19. An optical fibre sensor comprising an optical fibre and an elongate casing within which the fibre is contained and along which the fibre extends, said casing having an internal wall, a series of transverse ridges being formed on said internal wall integrally with said casing, said series extending along said casing, said casing being made of flexible but substantially inextendible material such that, upon application of external pressure to said casing, said ridges are effective to bend said fibre for modulating light passing through said fibre.

* * * * *